May 13, 1958 L. W. PARTRIDGE 2,834,898
VOLTAGE GENERATOR
Filed April 22, 1955 2 Sheets-Sheet 1
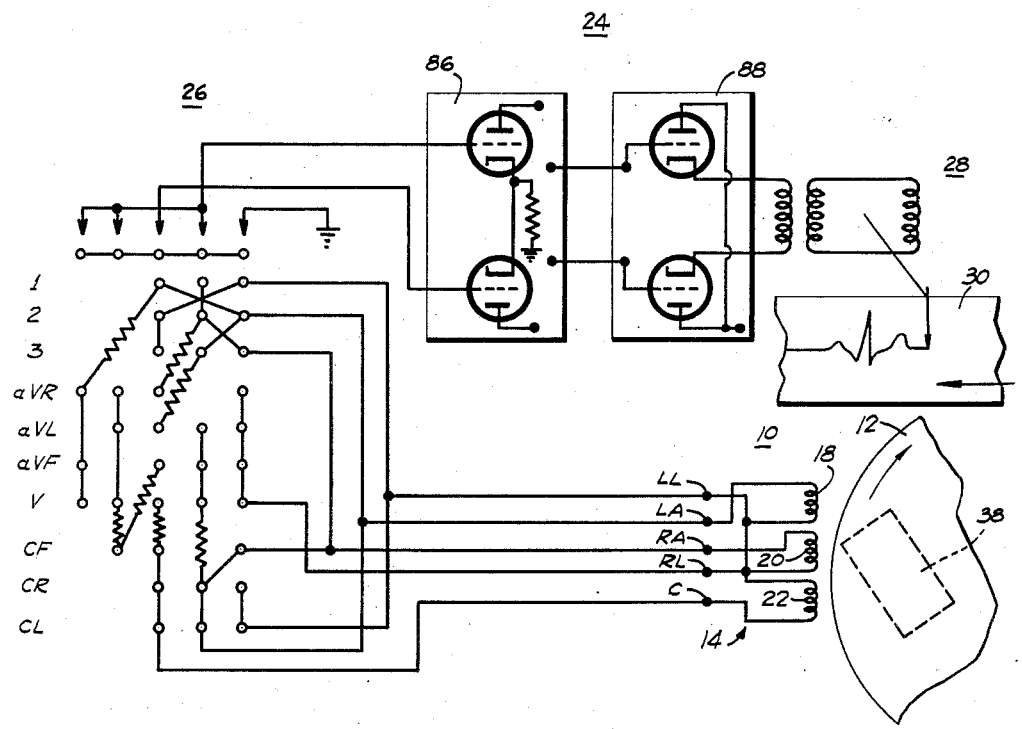
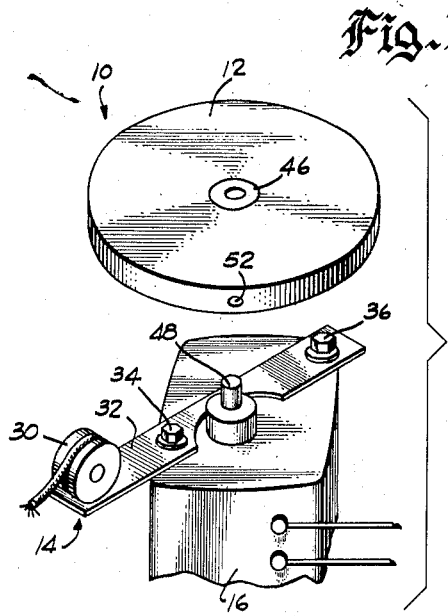
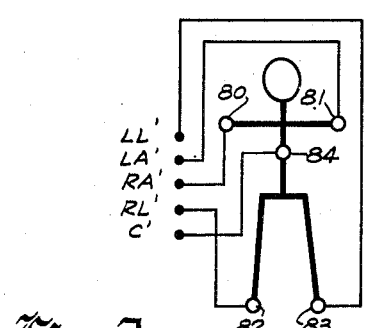
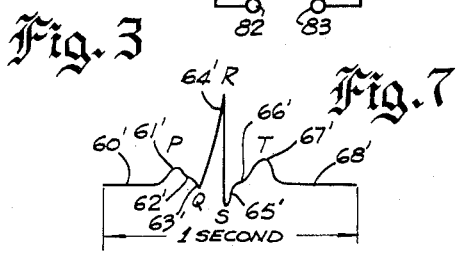
INVENTOR
LESLIE W. PARTRIDGE
BY
Mason, Kolehmainen, Rathburn & Wyss
ATTORNEYS May 13, 1958  L. W. PARTRIDGE  2,834,898
VOLTAGE GENERATOR
Filed April 22, 1955  2 Sheets-Sheet 2
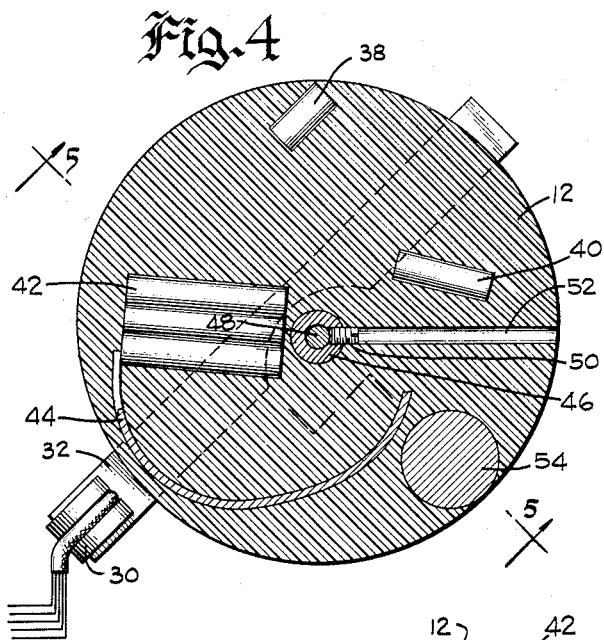
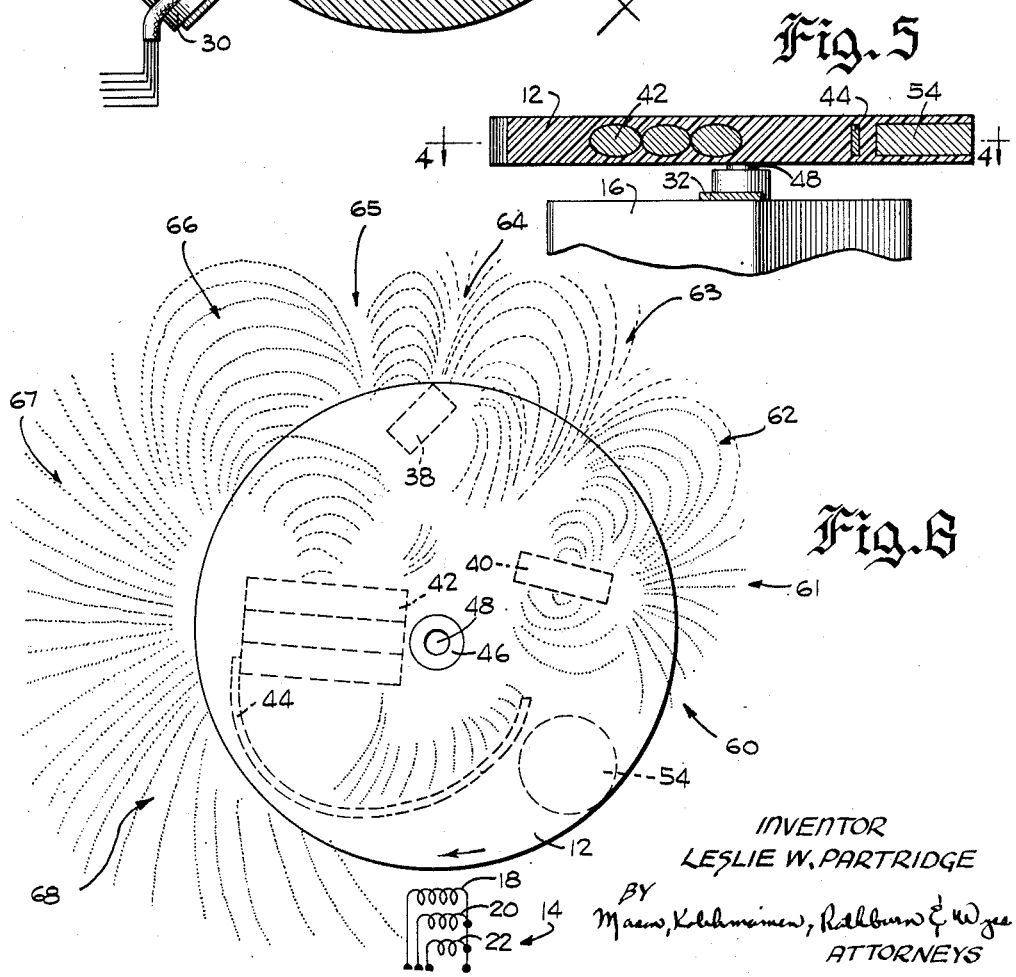
INVENTOR
LESLIE W. PARTRIDGE
BY
ATTORNEYS United States Patent Office 2,834,898
Patented May 13, 1958

2,834,898

VOLTAGE GENERATOR

Leslie W. Partridge, Janesville, Wis., assignor to The Burdick Corporation, Milton, Wis., a corporation of Delaware Application April 22, 1955, Serial No. 503,157

14 Claims. (Cl. 310—111)

This invention relates to a voltage generator and, more particularly, to an electronic device for generating voltages for operating an electrocardiograph.

In checking the response and operation of electrocardiographs and similar apparatus which normally are operated in accordance with naturally induced voltages such as those produced by cardiac action, a human subject is usually required to produce the necessary operating voltages. However, it is not convenient to attach the pickup electrodes for supplying voltages to the electrocardiograph, usually five in number, to a human subject each time that apparatus of this type is to be tested or displayed. Alternatively, the static or no load operating characteristics of the apparatus may be determined by establishing normal unloaded operating conditions, but a static test of this type often does not reveal operational failures which are easily detected under dynamic testing conditions when the apparatus is loaded. Obviously, a lack of dynamic testing makes it extremely difficult to maintain reliable production quality controls. In addition, in demonstrating electrocardiograph apparatus, it is not convenient either to apply electrodes to or to maintain the electrodes on a human subject for the relatively long periods of time necessary to adequately display the operation of the apparatus.

Accordingly, one object of the present invention is to provide new and improved voltage generating means.

Another object is to provide means for providing a voltage simulating the voltage wave produced by cardiac action.

A still further object involves the provision of a stable generator utilizing magnetic and inductive means which are moved relative to each other to produce voltages for operating an electrocardiograph.

Another object is to provide an electrocardiograph apparatus which is selectively energized under the control of electronic voltage generating means.

A still further object is to provide electronic means for supplying different combinations of voltages of similar waveforms to the input of an electrocardiograph.

A still further object is to provide an easily constructed and portable stable voltage source for operating electrocardiographic apparatus.

In accordance with these and many other objects, an embodiment of the present invention comprises a voltage generator comprising a pickup coil assembly adjacent which a plurality of permanent magnets imbedded in a plastic disc are moved at a constant speed by a motor for the purpose of developing voltages in the pickup coil assembly. The coil assembly includes a plurality of separate windings developing voltages of different amplitudes and polarities, and similar waveforms occurring with identical periodicity. The magnets in the plastic disc are located in a plurality of different positions relative to the pickup coil assembly and are provided with varying magnetic field configurations so that the waveforms of the voltages induced in the plurality of coils in the pickup coil assembly closely resemble the basic configuration of the PQRST wave naturally generated by cardiac action. The three pickup coils are interconnected to provide a five terminal network whose terminals correspond to the five electrodes usually applied to the two arms, the two legs, and the chest of a human subject. The network terminals are selectively connected to the input of an electrocardiograph by a switching arrangement which combines the voltages supplied by the pickup coil assembly to provide waveforms of different amplitudes and configurations, thereby to cause operation of the electrocardiograph in a manner similar to that caused by the application of cardiac induced voltages thereto.

Other objects and advantages of the present invention will become apparent from the following description of an illustrative embodiment thereof in the course of which reference is made to the accompanying drawings in which:

Fig. 1 is a schematic view of an electrocardiograph having input means selectively energized in accordance with voltages generated by an electronic voltage generating means embodying the present invention;

Fig. 2 is a diagrammatic showing of the conventional pickup electrode arrangement on a patient for supplying voltages for operating the electrocardiograph shown in Fig. 1;

Fig. 3 is an exploded perspective view of a pickup coil assembly, a motor, and a rotatable magnet supporting disc forming the electronic cardiac voltage source of the present invention;

Fig. 4 is a cross sectional view of the rotatable disc taken along line 4—4 in Fig. 5, assuming the disc to be completely shown therein;

Fig. 5 is a cross sectional view taken along line 5—5 in Fig. 4, assuming the entire disc structure to be disclosed therein;

Fig. 6 is a top plan view of the rotatable disc showing the flux patterns of the magnetic means supported thereon; and Fig. 7 is a diagrammatic view of the basic waveform of the voltage produced by the cardiac voltage source of the present invention.

Most present electrocardiographic apparatus is designed for operation under the control of a plurality of voltages derived, in varying combinations, between patient pickup electrodes such as the electrodes 80, 81, 82, 83, and 84 (Fig. 2) which are applied to the right arm, left arm, right leg, left leg, and chest, respectively, of a human patient. These five electrodes are provided with terminals or connectors RL′, RA′, LA′, LL′, and C′ which are connected to the similarly designated terminals in Fig. 1 of the drawings to provide naturally induced cardiac voltages for operating an electrocardiograph 24. The electrocardiograph 24 may be of any suitable type such as the one shown in my copending application, Serial No. 445,235, filed July 23, 1954, which application is assigned to the same assignee as the present invention. The voltages provided by these five electrodes are selectively connected, by a switching device 26, to the input of the electrocardiograph 24 in a plurality of different combinations, such as those identified by the ten designations adjacent the left hand portion of the switching device 26 in Fig. 1, to provide a plurality of potentials indicative of the voltages existing between different extremities of the human body. These potentials selectively energize a recording mechanism 28 connected to the output of the electrocardiograph 24 to record the waveforms thereof on a moving record sheet or tape 30. The voltage waves have a basic configuration similar to that shown in Fig. 7 in including successive P, Q, R, S, and T portions usually occurring at one second intervals. Even though the waveforms of the voltages supplied by the electrodes 80–80 are basically similar and of the same periodicity, the amplitudes of these cardiac voltages vary considerably between the various extremities of the body. In addition, the polarity of the voltage provided at the chest terminal C' is reversed from that provided at the other terminals. In essence, therefore, the human patient can be considered as providing a number of complex voltages of substantially similar waveforms, identical periodicities, and varying amplitudes and polarities which are selectively applied to the input of an electrocardiographic apparatus.

Insofar as these electrical characteristics are concerned, the patient can be considered to be a five terminal network including four complex waveform voltage generators connected to provide four output leads and a single common lead or connection. However, from an empirical viewpoint, the measurable voltage actually existing between the right leg and the left leg of the patient is extremely small, and the electrodes 82 and 83 may be considered as being at substantially the same potential. In view of this simplification, the equivalent circuit of the patient comprises a five terminal network including only three voltage generators and having two of the terminals, i. e. those connected to the right and left leg electrodes 82 and 83, connected to provide the common lead. This common connection can be assumed to be a point within the patient's heart providing a reference voltage relative to which the voltages supplied by the three generators vary.

With respect to the waveforms of the complex voltages provided by the electrodes 80–84, the voltages developed at the different extremities of the patient are somewhat different in configuration but they are similar enough that the three voltage generators in the analogue network can be designed to provide only a single waveform without causing an appreciable discrepancy between the natural cardiac induced voltages and the voltages produced by the electrical analogue network. More specifically, although the relative proportions of the components of the heart wave varies in accordance with the location on the patient's body at which the potential is derived, all of the waves include the P, Q, R, S, and T portions illustrated in Fig. 7.

However, the relative magnitudes of the cardiac voltages vary considerably in accordance with the electrodes from which the voltages are derived. Since the leg electrodes in the patient's equivalent circuit are assumed to be at the same potential and thus connected together to provide a common connection, the three generators in the analogue circuit represent the voltages derived from the chest electrode 84 and the two arm electrodes 80 and 81, the voltage derived at the chest electrode 84 being reversed in polarity from that supplied at the arm electrodes 80 and 81. To determine the relative magnitudes of these voltages, the amplitudes of the R portions of the waves supplied at the electrodes 80, 81, and 84 are measured, these amplitudes being generally proportional to the amplitudes of all of the other components of the complex wave. More specifically, the electrodes 80–84 are applied to a patient and the switching device 26 is adjusted to the three positions (2, 3 and CF in Fig. 1) in which the potentials derived by the electrodes 80, 81, and 84 are recorded on the tape 30 by the mechanism 28. By measuring the heights of the R waves on an electrocardiogram taken from the patient in these three positions, the magnitudes of the voltages to be supplied by the three generators in the equivalent circuit is determined.

To determine the magnitude of the voltage supplied by the right arm electrode 80 to the connected terminals RA, RA', the switch 26 is adjusted to the position 2 in which the potential between the right arm electrode 80 and the left leg electrode 83 is applied to the electrocardiograph 24. Since the right and left leg electrodes are connected to provide a common point in the equivalent circuit, the height of the R wave recorded on the tape 30 in position 2 of the switch 26 represents the relative value of the voltage to be supplied by the generator in the analogue circuit which is connected to the terminal RA. In a similar manner, the relative values of the voltages to be supplied by the two other generators in the analogue circuit to the terminals LA and C is determined by adjusting the switch 26 to positions 3 and CF in which the voltages between the left arm and the left leg, and the chest and the left leg, respectively, are applied to the input of the electrocardiograph 24. In one particular application, the magnitudes of the voltages between the common leg connection and the right arm, the left arm, and the chest are 11.7 mv., 5 mv., and 9 mv., respectively. In view of the approximation involved in placing the right and left legs at the common point, as compared with the small potential existing between these two points, there is a small variation between the voltages provided by the analogue circuit and the voltages provided by an electrode array on a patient. However, this variation is relatively small and does not affect, to an appreciable degree, the operation of the electrocardiographic apparatus.

In summary, therefore, the voltages provided by an array of five pickup electrodes applied to the extremities of a human patient can be simulated by an equivalent analogue network including three separate voltage generators connected between terminals representing the right and left arms and the chest and a pair of electrically common terminals representing the right and left leg electrodes. These generators must provide voltages of waveforms similar to the PQRST wave naturally induced by cardiac action which recur at the same periodicity. Further, the relative magnitudes of the three output voltages must correspond to the relative values of the naturally generated voltages, and the polarity of the voltage supplied at the chest terminal must be reversed with respect to the voltages supplied at the arm terminals.

Referring now to Fig. 3 of the drawings, a voltage generator 10, embodying the present invention, provides a five terminal network including three separate voltage sources for generating cardiac simulating voltages falling within the above parameter conditions. In general, the generator 10 comprises a plastic disc 12 in which a plurality of permanent magnets are imbedded and which is moved relative to a fixed position pickup coil assembly 14 including three separate coils 18, 20, and 22 (Fig. 1) by a motor 16. Rotation of the disc 12 causes the three coils 18, 20, and 22 to be selectively and sequentially linked with the flux fields of the magnets so that each of these coils forms one of the three generators of the patient's analogue circuit, thereby to provide three different amplitude voltages of similar waveforms occurring with identical periodicity at the terminals RA, RL, LA, LL, and C.

To provide the five terminal, three generator equivalent circuit of the patient, one side of each of the three coils 18, 20, and 22 forming the assembly 14 is connected to the terminals RL and LL representing the right and left leg electrodes to provide the common or reference voltage level connections. The other sides of the coils 18, 20, and 22 are connected to the left arm terminal LA, the right arm terminal RA, and the chest terminal C, respectively, thereby to provide the three voltage output connections. The coils 18, 20, and 22 preferably are similarly wound about a coil form 30 approximately three-fourths of an inch in diameter and are superimposed upon each other. The superposition of the coils 18, 20, and 22 insures that the individual voltages developed therein by moving the flux fields of the magnets relative thereto have identical waveforms inasmuch as the same flux pattern links all the coils at the same time. Further, since all of the coils are similarly wound, the end of the chest voltage coil 22 which is connected to the common lead extending to the leg terminal RL and LL is opposite from the ends of the coils 18 and 20 which are connected to the common lead, thereby to provide a reversed polarity voltage output at the chest terminal C. The coil form 30 is secured to a position adjacent the outer periphery of the disc 12 by a flexible supporting arm 32 which is fastened to an upper wall surface of the motor 16 by a pair of bolts 34 and 36.

In order to provide three voltages which vary in the proper relationship to each other to correspond with the empirically determined values of naturally induced cardiac voltages, the coils 18, 20, and 22 are wound with different numbers of turns. A variation in the number of coil turns provides different voltages across the coils since the three coils are simultaneously linked by the same flux pattern. For example, as set forth above, the coils 18, 20, and 22 can be wound to provide waveforms in which the R portions thereof have the values of 11.7, 5, and 9 millivolts, respectively. If desired, these coils can be provided with taps to permit different selected voltages to be derived therefrom.

In order to provide a flux pattern for generating a voltage of the waveform shown in Fig. 7, a plurality of bar magnets 38, 40, and 42 and a curved elongated iron strip 44 are carried on the disc 12, which disc may be approximately four inches in diameter. These magnets and the strip 44 preferably are imbedded in the body of the disc 12, which may be formed of a plastic material, although any other suitable supporting means therefor may be utilized. The magnet 40 produces a magnetic field which, when coupled with the coil assembly 14, generates the P portion of the waveform shown in Fig. 7 of the drawings, the magnet 38 produces the QRS portion of the wave, and the magnet 42 together with the iron strip 44 produces the T portion of this wave. Accordingly, when relative movement is produced between the pickup coil assembly 14 and the magnets 38, 40, and 42, the successive coupling of the fields of these magnets with the coils 18, 20, and 22 causes the production of a composite PQRST voltage waveform comprising the individual waveform characteristics due to the fields of each of the magnets 38, 40, and 42.

The magnet 40, which may be approximately three-fourths of an inch long, is positioned inwardly from the outer periphery of the disc 12 and is inclined relative to a horizontally extending radius of the disc 12 so that a line projected along the longitudinal side of the magnet 40 intersects the radius at an angle of approximately fifteen degrees. The inclination of the end of the magnet 40 relative to the outer periphery of the disc 12 causes the uneven distribution of the flux field thereof at the outer edge of the disc 12, as shown in Fig. 6 of the drawings.

The magnet 38, which generates the QRS portion of the wave and which may be approximately one-half inch long, is positioned immediately adjacent the outer edge of the disc 12 and is inclined relative to a vertically extending radius of the disc 12 so that a line passing along the transverse edge thereof intersects the radius at an angle of approximately forty-five degrees. As in the case of the P magnet 40, the inclination of the pole face of the magnet 38 causes an uneven flux distribution at the outer periphery of the disc 12.

The T wave generating magnet 42, which may comprise three separate bar magnets approximately one and one-quarter inches in length, is spaced slightly inwardly from the outer edge of the disc 12 and is inclined relative to a horizontal radius extending outwardly from the axis of rotation of the disc 12 so that a line passing longitudinally along the magnet 42 intersects the radius at an angle of approximately five degrees. The strip 44, one end of which engages a portion of the outermost pole face of the magnet 42 and the other end of which is curved inwardly toward the axis of rotation of the disc 12, may be approximately three and one-half inches long and seven thirty-seconds inches wide. As shown in Fig. 6, the strip 44 distorts the flux pattern of the magnet 42 so that the intensity thereof gradually decreases in the direction in which the strip extends.

To provide means for drivingly connecting the disc 12 with the motor 16, a sleeve 46 is molded in the disc 12 slightly displaced from the center thereof in such a position that the magnet 38 moves closest to the pickup coil assembly 14 during rotation of the disc 12. This offcenter arrangement is desirable because the tangential component of the rotary speed of the disc 12 is thus the greatest when the QRS magnet and its field pass the assembly 14, thereby facilitating the production of the large amplitude portion of the QRS wave by increasing the rate of change of the flux linking the assembly 14. Accordingly, the amplitude of the R portion of the wave may be adjusted by bending the supporting arm 32 to locate the assembly 14 in various selected positions relative to the outer periphery of the disc 12.

A shaft 48 of the motor 16 is received within the sleeve 46 and is secured therein by a set screw 50 which is threadedly received within the sleeve 46. The setting of the screw 50 is adjusted by suitable means inserted in a radially extending opening 52 in the disc 12. Since the disc 12 is rotated about an offcenter axis, a nonmagnetic counterweight 54, which may be formed of brass, is imbedded in the plastic material to dynamically balance the disc 12 and thus prevent irregular rotation thereof.

To provide for successively and cyclically coupling the pickup coil assembly 14 with the flux fields of the magnets, the motor 16 is adapted to rotate the disc 12 in a clockwise direction, as shown in Figs. 3 and 6. Since the generation of a single cycle of the waveform shown in Fig. 7 requires a complete cycle of rotation of the disc 12, and since the periodicity of the cardiac signals is approximately sixty cycles per minute, the motor 16 rotates at a speed of sixty R. P. M. This speed is easily provided by a synchronous motor which is energized from a sixty cycles per second, one hundred twenty volt commercial supply.

Fig. 6 of the drawings shows a possible flux pattern resulting from the individual fields of the magnets 38, 40, and 42 and permits the formulation of a possible theoretical explanation of the manner in which rotation of the disc 12 relative to the coil assembly 14 produces a voltage of the waveform shown in Fig. 7 of the drawings. More specifically, as the P wave generating magnet 40 is rotated relative to the coil assembly 14, the windings thereof are initially linked with the outwardly directed portion 60 of the flux field of the magnet 40, which is of relatively low and uniform intensity, and, consequently, a very small voltage represented by the relatively flat portion 60' of the waveform shown in Fig. 7 is produced. This low intensity field is due to the inward spacing of the magnet 40 and the inclination of the pole face thereof relative to the outer periphery of the disc 12.

The assembly 14 is next linked with a portion 61 of the flux field of the magnet 40 which is vectorially outwardly directed and of increased intensity due to the inclination of the magnet 40, thereby producing the positively directed portion of the P wave 61'. As the portion 61 of the field is moved beyond the assembly 14, the decrease in the flux linkage produces the negatively directed portion of the P wave 61'.

As a portion 62 of the field is linked with the coil assembly 14, the uniform low intensity field causes the production of the segment 62' of the wave due to the small rate of change of flux linking the assembly 14. At a point 63, the coil assembly 14 is coupled with and decoupled from a composite field due to both of the magnets 38 and 40 which is of relatively strong intensity and which is vectorially directed inwardly toward the axis of rotation of the disc 12, thereby to produce a negatively directed peaked Q portion 63' of the wave.

Thereafter, a field 64 of relatively high intensity which is vectorially directed outwardly away from the disc 12 is intercepted by the coil 14 to produce the positively directed peaked R portion 64' of the output wave. The R portion 64' of the wave, although due to the field produced by the QRS magnet 38, is of greater amplitude than the Q portion of the wave because of the increased field strength due to the inclination of the magnet 38 and the close spacing between the coil assembly 14 and the outer end of the magnet 38 resulting from the eccentric mounting of the disc 12.

The coil assembly 14 is next linked with a portion 65 of the composite field produced by the interaction of the fields of the QRS magnet 38 and the T wave magnet 42 which is directed inwardly toward the center of the disc 12. This portion of the flux field produces a negatively directed S portion 65′ of the simulated cardiac voltage.

Thereafter, the coil assembly 14 is linked with a relatively weak and uniform intensity field 66 produced by the T wave magnet 42 for a relatively long time interval to produce a substantially flattened portion 66′ in the voltage waveform interconnecting the S and T portions of the wave.

Subsequent movement of the disc 12 causes a relatively intense and wide portion 67 of the flux pattern produced by the T wave magnet 42 to be intercepted by the coil assembly 14, thereby to produce a relatively wide positively directed T wave portion 67′. The width and the intensity of the sector 67 of the flux pattern is due to the increased physical width and magnetic strength of the T magnet 42 together with the location thereof relative to the outer periphery of the disc 12.

In order to provide a flat portion 68′ contiguous to the substantially flat portion 60′ of the complex wave, the iron strip 44 is provided. As indicated in the schematic diagram in Fig. 6, the magnetic circuit extending from the pole face of the T wave generating magnet 42 through the strip 44 produces an outwardly directed portion 68 of the flux pattern which is relatively weak and of uniform intensity so that movement of this portion of the field relative to the assembly 14 produces an insignificant change in the flux linking the coil assembly 14, thereby to produce the substantially flat portion 68′.

In summary, therefore, the voltage generator 10 provides a stable, easily controlled source of voltage for operating an electrocardiograph by utilizing a plurality of permanent magnets 38, 40, and 42 which are rotated relative to a fixed position coil assembly 14. Since the windings 18, 20, and 22 forming the assembly 14 are positioned in substantially identical positions relative to the path of movement of the magnet supporting disc 12, substantially identical composite waveforms of identical periodicity are generated in each of the three coils. The magnitude of the voltages provided by the coils are suitably adjusted by providing different numbers of turns for each of these coils. Since the coils are of relatively low impedance, a negligible amount of sixty cycles per second pickup voltage is induced therein due to the field of the motor 16.

When it is desired to operate the electrocardiograph 24 either for demonstration or testing purposes, the electronic voltage generator 10 is connected to the terminals RA, RL, LL, LA, and C so that, upon energization of the motor 16, the disc 12 is continuously rotated relative to the fixed coil assembly 14, thereby to continuously and successively generate, in the windings 18, 20, and 22, a plurality of substantially identical voltages having different amplitudes and polarities. These voltages are selectively applied to the contacts of the switch 26 so that, upon moving the contactor or wiper structure thereof to the various positions designated in Fig. 1, a plurality of different voltages formed by combining the generated voltages supplied by the generator 10 are applied to the input of a voltage amplifier 86, which amplifier forms a portion of the electrocardiograph 24. The output of the amplifier 86 is supplied through a power amplifier 88, also forming a portion of the electrocardiograph 24, to control the operation of the recording mechanism 28, whereby a graphic representation of the voltages induced in the coil assembly 14 is produced on the record tape 30. The relative amplitudes and polarities of the waves recorded by the mechanism 28 in the successive settings of the switching device 26 are varied in accordance with the conventional combinations in which the voltages derived from the electronic voltage generator 10 are supplied to the control grids of the voltage amplifier 86.

Although the cardiac voltage generator 10 has been described by reference to the specific sizes and dimensions of the coil assembly 14, the disc 12, the magnets 38, 40, and 42, and the strip 44, it is to be understood that these specifications merely describe a particular embodiment which is suitable for providing cardiac simulating voltages. Since the production of suitable voltages is mutually dependent upon the strength of the magnets, the location thereof relative to the disc 12, the speed of rotation of the disc, the diameter and number of turns of the coils 18, 20, and 22, the spacing of the coil assembly 14 relative to the outer periphery of the disc 12, and many other factors, it should be understood that these details are not a limitation of the invention and that numerous other devices may be devised by those skilled in the art which will fall within the scope and spirit of the principles of this invention.

What is claimed as new and desired to be secured by Letters Patent of the United States is:

1. An apparatus for use with an electrocardiograph adapted to be operated by cardiac voltages derived from electrodes applied to two legs, two arms, and the chest of a human being and including an amplifier having a pair of input leads comprising a voltage generating network having three voltage generating means connected to provide three output leads connected to one side of each of said three generating means and two output leads connected in common with said three generating means, said three output leads and said three generating means providing voltage waves representing voltages derived from two arm electrodes and one chest electrode, said two common output leads providing voltages representing voltages derived from two leg electrodes; and switching means for selectively connecting said output leads to said pair of amplifier input leads.

2. An apparatus for generating complex waves comprising a coil structure including a plurality of separate coils, a plurality of magnets having different field orientations representing differently shaped components of a complex waveform and movable relative to said coil structure, and means for producing successive relative movement between said magnets and said coil structure to sequentially place said coils in a flux linking relation with each of said magnets, thereby to generate distinct voltages in each of said separate coils including the components represented by said different field orientations.

3. An apparatus for use with an electrocardiograph including an amplifier having input means comprising a multiple terminal voltage generating network including a plurality of inductive means, means for successively linking said inductive means with a plurality of different and distinct magnetic fields to generate voltages having the waveforms of cardiac induced voltages in said inductive means, and switching means for selectively applying said voltages to said input means.

4. Apparatus for use with electrocardiographic apparatus adapted to be normally energized by voltages derived from two leg electrodes, two arm electrodes, and a chest electrode and applied to electrocardiograph input terminals individual thereto comprising an electronic circuit supplying artificially generated voltages to said apparatus resembling the voltages derived from said electrodes, said circuit including three separate voltage sources individually connected to three of said terminals and connections common to said three sources extending to two of said terminals.

5. The apparatus set forth in claim 4 in which the three voltage sources are connected to the terminals representing the two arm electrodes and the chest electrode and the common connections extend to the terminals representing the leg electrodes.

6. The apparatus set forth in claim 5 in which the three voltage sources provide waveforms corresponding to a PQRST wave and having the individual amplitudes thereof varied in accordance with the electrode representing terminal to which the sources are connected.

7. The apparatus set forth in claim 4 in which the polarity of one of the voltage sources is reversed from that of the other two sources.

8. A device for generating cardiac representing voltages for use in operating electrocardiographic apparatus comprising a pickup coil assembly including a plurality of separate coils, means connecting said coils to provide a plural terminal network adapted to be connected to said apparatus, a plastic disc, a plurality of permanent magnets imbedded in said disc, each of said magnets being differently oriented relative to said disc to provide a distinctive peripheral magnetic field pattern of a particular configuration, and means for rotating said disc relative to said pickup coil assembly thereby to cause said magnetic field patterns to successively link said pickup coil assembly to produce a composite complex voltage waveform representing a cardiac voltage in each of said separate coils including a voltage component proportional to the field pattern of each of said magnets.

9. The device set forth in claim 8 in which the composite voltage waveform includes several different characteristic components and in which separate permanent magnets are provided for generating voltages having some of the characteristics of the generated waveform and a single magnet is provided for generating a portion of the waveform including more than one of said different characteristics.

10. The device set forth in claim 8 in which the disc is mounted for rotation about an eccentrically disposed axis so that one of said permanent magnets moves closer to said pickup coil assembly than the other magnets.

11. An apparatus for generating complex waves including a plurality of differently shaped component parts comprising a pickup coil, a plurality of magnets, each of said magnets having a particular field orientation and strength different from the other magnets, driving means for producing relative movement between said pickup coil and each of said magnets in succession so that the fields of said magnets are sequentially linked with said pickup coil to generate a continuous complex wave including successive and different component parts resulting from the fields of said plurality of magnets.

12. An appaartus for generating cyclically recurring complex waves including a plurality of differently shaped component parts comprising a supporting member mounted for rotation about an axis, a plurality of magnets carried on said supporting member, said magnets having different field orientations relative to said axis to provide magnetic fields of different strengths adjacent the periphery of said supporting member representing said differently shaped component parts, a pickup coil disposed adjacent the periphery of said supporting member and adapted to intercept said magnetic fields of different strengths, and means for rotating said supporting member so that said pickup coil is successively linked by said fields of different strengths to generate a continuous voltage having a waveform including the different component parts represented by said different fields.

13. An apparatus for generating a complex wave including a plurality of differently shaped component parts comprising a supporting member; a plurality of magnets carried on said supporting member, said magnets being disposed at different spaced positions on said supporting member to provide a plurality of magnetic field patterns of different strength and orientation when intercepted along a predetermined path, said patterns representing said differently shaped component parts of said complex wave; a pickup coil disposed adjacent said supporting member and adapted to be linked by said different field patterns; and means for producing relative movement between said supporting member and said pickup coil to produce relative movement of said coil along said predetermined path to successively intercept said plurality of different field patterns to generate a continuous voltage including said component parts resulting from said different field patterns.

14. An apparatus for use with an electrocardiograph including input leads adapted to be energized by selected naturally generated cardiac voltages supplied by electrodes on the arms, the legs, and the chest of the patient; comprising a multiple terminal voltage generating network selectively connected to said input leads and comprising inductive means, magnetic means including a plurality of magnets providing an irregular effective field pattern including different and distinct magnetic fields representing differently shaped components of a complex waveform resembling a cardiac induced voltage, and means for producing relative movement between said inductive means and said magnetic means so that said irregular field pattern is intercepted by said inductive means to generate a complex waveform including said differently shaped components for operating said electrocardiograph.

References Cited in the file of this patent

UNITED STATES PATENTS

| | | |
|---|---|---|
| 1,892,533 | Perry | Dec. 27, 1932 |
| 1,958,043 | Heintz | May 8, 1934 |
| 2,279,690 | Lindsey | Apr. 14, 1942 |

FOREIGN PATENTS

| | | |
|---|---|---|
| 16,614 | Great Britain | of 1915 |